US011890505B2

United States Patent
Evans et al.

(10) Patent No.: US 11,890,505 B2
(45) Date of Patent: Feb. 6, 2024

(54) SYSTEMS AND METHODS FOR GESTURAL DETECTION AND CONTROL IN IMMERSIVE AND INTERACTIVE FLUME SWIMMING POOLS

(71) Applicant: Real Big Waves LLC, San Antonio, TX (US)

(72) Inventors: George Reid Evans, San Antonio, TX (US); Jeffrey Scott White, Spicewood, TX (US); Marcelo Ortega, Montevideo (UY); Enzo Pacilio, Montevideo (UY)

(73) Assignee: Real Big Waves LLC, Austin, TX (US)

( * ) Notice: Subject to any disclaimer, the term of this patent is extended or adjusted under 35 U.S.C. 154(b) by 295 days.

(21) Appl. No.: 17/235,651

(22) Filed: Apr. 20, 2021

(65) Prior Publication Data
US 2021/0322824 A1 Oct. 21, 2021

Related U.S. Application Data

(60) Provisional application No. 63/012,871, filed on Apr. 20, 2020.

(51) Int. Cl.
*A63B 24/00* (2006.01)
*A63B 69/12* (2006.01)
(Continued)

(52) U.S. Cl.
CPC ...... *A63B 24/0006* (2013.01); *A63B 24/0075* (2013.01); *A63B 24/0087* (2013.01);
(Continued)

(58) Field of Classification Search
CPC ............ A63B 69/12; A63B 2024/0009; A63B 2024/0012; A63B 69/125;
(Continued)

(56) References Cited

U.S. PATENT DOCUMENTS

2004/0201675 A1* 10/2004 Murakoshi ................ G06T 7/20
348/157
2007/0261160 A1 11/2007 Logothetis
(Continued)

FOREIGN PATENT DOCUMENTS

| CN | 110005230 A | * | 7/2019 |
| KR | 20100124640 A | * | 11/2010 |
| WO | WO2020051093 | | 3/2020 |

OTHER PUBLICATIONS

SenSwim—AI video analysis system, SenSwim, Tel Aviv-Yafo, Israel, retrieved from https://www.senswim.com/, on Apr. 1, 2022, 4 pgs.
(Continued)

*Primary Examiner* — Megan Anderson

(57) ABSTRACT

Systems and methods for detecting gestures of a swimmer in an aquatic environment such as a flume pool. In one embodiment, a pool system includes a set of cameras, one of which is an overhead camera positioned above the water in the pool to capture images of a swimmer. The system also includes computer processors, such as a GPU, CPU, and game engine which implement a computer vision platform. The processors are configured to receive images from the cameras, determine the swimmer's body position from the images, detect a defined gesture in the swimmer's body position, and in response to detecting the defined gesture, invoking a corresponding control operation of the flume pool, such as controlling water flow through the pool or updating an interface display which is projected onto the interior surfaces of the pool.

19 Claims, 7 Drawing Sheets

(51) Int. Cl.
*A63B 71/06* (2006.01)
*G06F 3/01* (2006.01)
*G06T 7/70* (2017.01)
*G02B 23/22* (2006.01)
*G09G 3/00* (2006.01)
*H04N 9/31* (2006.01)
*G06V 40/20* (2022.01)
*G06V 40/10* (2022.01)
*G03B 21/606* (2014.01)

(52) U.S. Cl.
CPC ........ *A63B 69/125* (2013.01); *A63B 71/0622* (2013.01); *G02B 23/22* (2013.01); *G06F 3/017* (2013.01); *G06T 7/70* (2017.01); *G06V 40/107* (2022.01); *G06V 40/23* (2022.01); *G06V 40/28* (2022.01); *G09G 3/001* (2013.01); *H04N 9/3179* (2013.01); *A63B 2024/0009* (2013.01); *A63B 2024/0012* (2013.01); *A63B 2024/0081* (2013.01); *A63B 2024/0096* (2013.01); *A63B 2071/0647* (2013.01); *A63B 2071/0677* (2013.01); *G03B 21/606* (2013.01); *G06T 2207/30196* (2013.01); *G06T 2207/30221* (2013.01); *G09G 2354/00* (2013.01)

(58) Field of Classification Search
CPC ........ A63B 2071/0677; A63B 71/0622; A63B 2208/03; A63B 24/0006; A63B 24/0075; A63B 24/0087; A63B 2071/0647; A63B 2024/0081; A63B 2024/0096; G06V 40/23; G06V 40/107; G06V 40/28; G02B 2027/0138; G02B 23/22; G06F 3/017; G03B 17/08; E04H 4/0006; G06T 7/70; B63B 34/70
See application file for complete search history.

(56) References Cited

U.S. PATENT DOCUMENTS

| | | | |
|---|---|---|---|
| 2010/0281438 A1 | 11/2010 | Latta et al. | |
| 2011/0275045 A1 | 11/2011 | Bhupathi et al. | |
| 2015/0209614 A1* | 7/2015 | Lee | A63B 71/0622 482/8 |
| 2016/0306603 A1* | 10/2016 | Nadeson | G06F 3/011 |
| 2017/0266529 A1* | 9/2017 | Rekimoto | H04N 13/363 |
| 2020/0047055 A1* | 2/2020 | Ward | A63B 21/0058 |

OTHER PUBLICATIONS

StereoLabs homepage, StereoLabs, Inc., retrieved from https://www.stereolabs.com/zed/, on Apr. 1, 2022, 5 pgs.

Aspiricx—Lanevision homepage, Aspiricx, San Ramon, CA, retrieved from https://www.aspiricx.com/lanevision, on Apr. 4, 2022, 1 pg.

SwimEye homepage, SwimEye, Norway, retrieved from https://swimeye.com/, on Apr. 4, 2022, 13 pgs.

"Computer Vision Software wrnch Launches AI Pose Estimation Extension for NVIDIA Omniverse," AIThority, AI Technology Insights, retrieved on Apr. 4, 2022, copied from https://aithority.com/machine-learning/neural-networks/deep-learning/computer-vision-software-wrnch-launches-ai-pose-estimation-extension-for-nvidia-omniverse/, Apr. 13, 2021, 3 pgs.

Microsoft Kinect—Windows app development homepage, Microsoft Corp., US, retrieved from https://developer.microsoft.com/en-us/windows/kinect/, Apr. 4, 2022, 2 pgs.

Orbbec 3D homepage, Orbbec, Troy, MI, retrieved from https://orbbec3d.com/, Apr. 4, 2022, 5 pgs.

OpenCV homepage, OpenCV, Palo Alto, CA, retrieved from https://opencv.org/, Apr. 4, 2022, 9 pgs.

International Search Report issued for International PCT Application No. PCT/US2021/028210, dated Jul. 20, 2021, 13 pages.

* cited by examiner

SYSTEMS AND METHODS FOR GESTURAL DETECTION AND CONTROL IN IMMERSIVE AND INTERACTIVE FLUME SWIMMING POOLS

RELATED APPLICATIONS

This application claims priority under 35 U.S.C. § 119(e) to U.S. Provisional Application No. 63/012,871, entitled "Immersive and Interactive Flume Swimming Pool/Spa and Training Software and Facility", filed Apr. 20, 2020, which is fully incorporated herein by reference for all purposes.

TECHNICAL FIELD

This invention relates generally to the field of computer vision and more particularly systems and methods for detecting the position and movements of a user's body in an aquatic environment and interpreting and analyzing this information for use in controlling or enhancing the aquatic environment.

BACKGROUND

Swimming is one of the most popular, healthy and entertaining activities for youths in the United States, but this participation drops significantly for adults. For many, this is because swimming is boring, isolating, and inaccessible. Participation in swimming related activities would likely increase substantially if it were possible to provide better access to pools, an enhanced sense of enjoyment of swimming and a sense of belonging to group or swimming community.

Flume swimming pools/spas are small pools or spas which have pump systems that recirculate water through the pool/spa from one end to the other in order to create a water current through the pool/spa. A swimmer using one of these pools/spas can therefore swim in the current while remaining substantially stationary within the pool/spa. This allows the swimmer to swim for what is the equivalent of tens or hundreds of meters without leaving the confines of the pool/spa which is only several meters long.

While flume swimming pools/spas may increase the accessibility of swimming and provide increased opportunities for exercise, the fact that the swimming experience occurs within the confines of a relatively small, unchanging space may cause the swimmer to find the experience boring or isolating. It would therefore be desirable to provide improvements to flume swimming pools/spas which make them more enjoyable, more capable of providing coaching support, more entertaining and/or more useful.

SUMMARY

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

The systems and methods disclosed herein are used to provide a unique immersive, multi-sensorial experience that can increase people's enjoyment of swimming and recapture the sense of joy they had while swimming as children. Disclosed embodiments incorporate elements allowing users to participate, both remotely and on site, in activities ranging from competition to training to physical rehabilitation under the guidance of coaches, physicians and other professionals. These systems and methods can therefore connect likeminded and similarly situated users to create a larger sense of community.

One embodiment comprises a system implemented in a flume pool for detecting gestures of a swimmer. The system includes a set of cameras, at least one of which is overhead camera positioned above the water in the pool to capture images of a swimmer. The system also includes computer processors, such as a GPU, CPU, and game engine which implement a computer vision platform. The processors are configured to receive images from the cameras, determine the swimmer's body position from the images, detect a defined gesture in the swimmer's body position, and in response to detecting the defined gesture, invoking a corresponding control operation of the flume pool, such as controlling water flow through the pool or updating an interface display which is projected onto the interior surfaces of the pool.

In some embodiments, the set of computer processors includes a graphics processing GPU which executes a computer vision platform and is configured to determine the swimmer's body position from the images received from the cameras, and to generate corresponding skeletal body position data. The computer processors may further execute a game engine which is configured to receive the skeletal body position data from the GPU, identify the defined gesture from the skeletal body position data, and generate one or more control outputs corresponding to the defined gesture. The control outputs may be provided, for instance, to a flow controller of the pool, or to a graphics controller of an in-pool display system. In some embodiments, the set of computer processors further includes a CPU which is configured to transfer data between components of the system, such as transferring skeletal body position data from the GPU to the game engine, or transferring control outputs from the game engine to the control or display systems of the pool.

In some embodiments, the set of cameras includes one or more below-surface cameras positioned below the water level of the pool and configured to capture images of the swimmer's body in the pool without the distortions that are caused in the overhead cameras' images by surface disturbances (at the air-water interface). The below-surface cameras may be configured to capture more detailed, close-up images of the swimmer and may focus a portion of the swimmer's body (e.g., hands, arms, face, etc.) The GPU may be configured to determine the body position using the images captured by the overhead camera as a primary data reference and, when the GPU is unable to determine the body position based on the overhead camera images, determine the body position using the images captured by the below-surface camera as a secondary data reference.

The system may be configured to detect a number of custom gestures that are defined in the computer vision or game engine components of the system, such as a movement or position of the swimmer's head, hand or arm. Each of the custom gestures is interpreted as a corresponding control input or interaction as defined by the computer vision or game engine components. The detected custom gestures may be used as inputs to the system which cause corresponding actions by the system. For instance, a gesture may cause a control operation such as changing a rate at which water is circulated through the pool (e.g., pausing or resuming the water flow), or pausing/resuming an interactive experience which is projected by the display system onto the interior surfaces of the pool.

In some embodiments, the system includes a user interface which is configured to display a real time image of the swimmer overlaid with one or more coaching/training indicators. These coaching/training indicators may, for example, indicate an actual position of a part of the swimmer's body in relation to a desired position of the part of the swimmer's body to provide feedback to the swimmer for improving the mechanics of their stroke. The system may also track the swimmer's activity based on the detected body position over time, and may maintain one or more cumulative performance metrics that can be displayed to the swimmer via an in-pool display.

Numerous alternative embodiments may be possible.

The embodiments disclosed herein provide a number of advantages over existing systems and methods. The computer vision platform is specially trained to interpret the movement and form of a person in an aquatic environment in order to enable human-to-computer interaction, and to acquire meaningful data of the swimmer's movement. The system can detect a custom gesture that is initiated by a user while swimming so the user can order the computer to execute a command (e.g., make a selection, pause a video, etc.) The system can also help swimmers improve their swimming technique through a visual interface that adjusts based on the swimmer's real time body movement. Further, the system can collect movement data in real time that accumulates meaningful swimming metrics for the swimmer over time.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
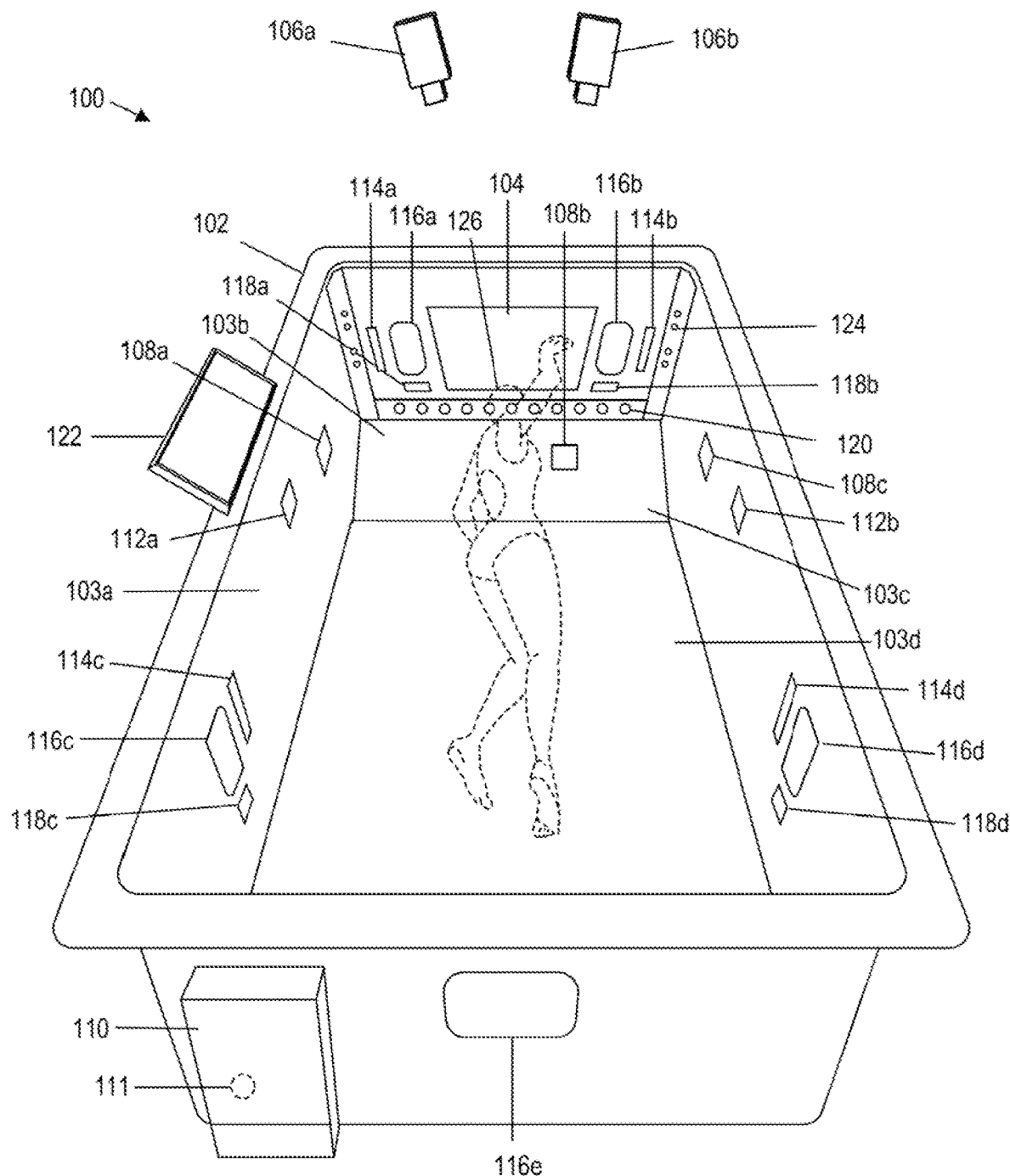
FIG. 1 is a diagram illustrating an exemplary flume pool/spa system in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present invention include systems and methods for detecting, interpreting and responding to a user's gestural movements within an aquatic environment. In aquatic environments where people are submerged or swimming, existing computer vision software systems are unable to consistently track the person's body position and movements with regularity. In some cases, the existing systems are unable to track the person at all. As a result, people in these aquatic environments can't communicate with a computer through a using their movements (e.g., gestures of the head or hands). Additionally, the computer cannot provide real time tracking or analysis of the person's body movements (e.g., to count or analyze a swimmer's strokes).

Embodiments disclosed herein enable the detection and interpretation of a user's movements in an aquatic environment such as a flume swimming pool/spa. These embodiments allow the user to make gestures with their body, which are detected and interpreted as inputs to a computer control system that is integrated with the pool/spa. These inputs may be used to control the operation of the pool/spa (e.g., changing the flow of water through the pool/spa) or to generate visual displays that are presented to the user. The computer system may also be configured to analyze the user's body movements to track or analyze the user's activity (e.g., counting strokes or computing an effective distance traveled), provide real time feedback to the user (e.g., guidance for adjusting the swimmer's stroke), interact with other users (e.g., virtually compete with other swimmers using similar network-connected pools/spas), etc.

One embodiment of the present invention is a flume swimming pool/spa system. For purposes of brevity, this may be referred to simply as a pool. It should be noted that this system is provided as an example, and alternative embodiments may be implemented in other types of aquatic environments as well, such as larger pools or bodies of water which may or may not have flume functions. The exemplary pool incorporates a set of cameras that capture image data of a swimmer in the pool, a set of computer processors that receive image data from the cameras, interpret the image data to identify gestural movements of the swimmer, and generate outputs that may control the pool, display output information to the swimmer, or monitor the swimmer's activity.

The set of cameras may include, for example, overhead cameras which are positioned above the swimmer and subsurface cameras which are positioned below the surface of the water in the pool. The overhead cameras are positioned above the surface of the water and may be configured to capture images (still or video) of the swimmer's entire body. Because the cameras are above the surface of the water, disturbances at the surface (i.e., at the air-water interface) may distort the image and impede accurate recognition of the body's position. The use of multiple overhead cameras may improve the capability of accurately determining the body position. Because the subsurface cameras do not view the body through the air-water interface, they are not subject to this distortion and provide another source of image data which helps to accurately identify the swimmer's body position. Furthermore, the subsurface cameras may be configured to capture images of only a portion of the body, which allows more detail to be captured. For instance, a subsurface camera may be positioned to capture images of the swimmer's head/face, arms and/or hands so that more detailed image data is available for identification of head and hand gestures.

The computer processors may include, for example, a set of processors that may be configured to handle specific functions of the system. In one embodiment, the system includes a graphics processing unit (GPU), a central processing unit (CPU) and a game engine. In this embodiment, the CPU handles the movement of data between the other components of the system (e.g., from the camera to the GPU, from the GPU to the game engine, etc.) The GPU is a specialized processor that is configured to receive the raw image data from the cameras and to generate body position data from the images. The body position data is then provided to the game engine, which is configured to interpret this data. The interpretation may include identifying gestures that are contained in the images, as well as identifying movements and activity represented by the images. The gestures and/or activity interpreted by the game engine is then used to generate outputs which drive a display which is presented to the swimmer and/or control the operation of the pool.

The present embodiment's computer vision and game engine are used to understand the user's interactions with the system (i.e. directives to the computer), as well as to understand the user's state of health. As an example of an interaction, the computer vision implemented in the system's GPU detects if a user has chosen to move to the left in an environment, or has requested the pool to increase its flow speed or accept a request to compete in a shared real-time workout from another connected pool. As an example of detecting a user's state of health, the computer vision application executing on the GPU detects if a user is in distress and automatically sends an alert for help and controls the pool itself to begin a rapid response draining of the pool. The computer vision application and game engine also allow remote monitoring and assessment of each user without the necessity of physical, on site presence. Information acquired by the system's cameras may also be shared with complimentary technologies of the system to maximize monitoring accuracy and user safety.

The swimming pool/spa system can enhance the swimming experience by displaying to the user/swimmer (e.g., via ultra short throw digital laser projectors) real or fictional worlds which evolve and are altered, both visually and tactically, based on user input. For example, an application may control the flow of water through the pool enclosure to allow the user to swim, while at the same time presenting video of a swimming experience (e.g., swimming in an open-water environment such as a coral reef world) in synchronization with the water flow to simulate the real-life experience. This is enabled by using the multi-camera system to capture images of the swimmer, interpreting the captured images to determine the body position of the swimmer, analyzing the swimmer's body position to detect gestures and actions of the swimmer, and controlling the operation of the pool system in response to the detected gestures and actions. The gestures (e.g., nodding the head or making a closed first) may be provided as user inputs to the system, starting and stopping applications and water flow, providing input to an application, adjusting projected displays, etc. Actions which are not gestures (e.g., swimming) are monitored and may be tracked (e.g., counting the number of strokes, or maintaining a distance traveled) or analyzed (e.g., determining whether the swimmer is using proper form). The gestures and actions may also affect the user experience presented by the pool. For instance, Users may receive feedback while using the system to enhance sensation and stimulus based upon the feedback provided. For instance, the gaming engine may activate the pool to release bubbles to simulate brushing up against a whale.

Embodiments disclosed herein can also provide features such as User Detection, Personal Identification of Users, Monitoring and Responding to users, providing Exercise Modules, interconnecting pools, enabling custom experience designs, collecting data, identifying system status, and detecting emergencies. These features are described in more detail below.

User Detection. Embodiments disclosed herein can detect if a user is in the pool, where the user is in the pool and what the activity or movement is occurring, such the speed and location of the user, duration of particular activities, nature and duration of specific physical activities and gestures. This is made possible by using a combination of a camera array around and within the pool. All of the camera's feeds are delivered to two different artificial intelligence software platforms for real-time analysis. One is a complete computer vision platform that detects and recognizes a human's movement. It then layers and skeletally maps that movement, helping the system understand where an individual's limbs and body is. Basic gestural movements detected by the computer vision platform are interpreted as inputs (e.g. such as "select this button," stand-up to stop the pool flow, etc.) The image/video feeds from the cameras are also provided to software which interprets that data and makes sense of it for deeper physiological analysis. For example, this software may determine the number of strokes performed by the swimmer and its stroke force velocity.

Monitor and Respond. The present embodiments may monitor, record and respond to a user, including recognition of the user, recognizing physical movements, analyzing speed, angle and velocity of the user, monitoring and recognizing various input requests (i.e. interactions) provided by the user, and monitoring and recognizing emergency situations. This is enabled by taking the footage of the live feeds of the camera array system and analyzing it in real time with the computer vision platform, which provides the system with the capability to analyze the swimmer as well as utilize the swimmer as a game controller. For the game controller aspect, the swimmer will have been trained on gestures that the computer recognizes as inputs, which the computer can then use as decisions to adjust aspects of the overall system (e.g. speed of water flow, what to display through the projectors, making a selection within a graphical user interface, etc.)

Exercise Modules. Some embodiments use dynamic training modules that can automatically change the speed of the water current while the user is swimming in order to adjust to the desire speed of the user. These embodiments feature pre-programmed workouts for beginner, intermediate and advanced levels using exercise modules ranging from high-impact training conditions to slow cool-down speeds. The pre-programmed workouts contain software that alerts and controls the speed of the motor. If there is no preprogrammed speed for a workout routine, the computer uses the camera array and the computer vision platform to detect swimmers movement and speed, which then reports back to the computer to determine the appropriate speed for the motor to deliver flow. The computer will then make automatic adjustments to the motor's VFD to allocate the proper speed of the water flow.

Connected Pools. The system digitally connects to the cloud, enabling users to interact with other users and facilitators, which is helpful in enabling and facilitating various competitive, coaching and rehabilitative scenarios.

Custom Experience Designs. Users or game developers can design custom worlds and respective physical activities within the pool system.

Data Collection. Some embodiments collect, store and analyze data for each user, tracking fitness progress with metrics like distance, calories, time, etc. The user can choose to access and activate their data in order to generate more personalized and predictive environments, responses/feedback and ability to share data with other users. The data can also be utilized by therapists, physicians and coaches in assessing the user's progress and adjusting routines or techniques based on this digital feedback. The computer software can recommend workouts or training regimens for the swimmer based on an analysis of their previous workout history, stroke analysis (accomplished via computer vision), and goals. The software then pairs them with the most relevant workouts or training regimes.

System Status. Some embodiments communicate and detail their history, repairs, problems, updates, etc. to people researching, diagnosing, repairing or buying or selling the system.

Emergency Detection. Some embodiments detect stress and emergency related events and alert appropriate persons, including 911, and initiate immediate safety protocols (e.g. rapid auto-draining of a pool).

Referring to FIG. 1, an exemplary flume pool/spa system in accordance with some embodiments is shown. In this embodiment, the pool system 100 is integrated into a pool enclosure 102 which is partially filled with water, forming an aquatic environment. Pool enclosure 102 has a water propulsion or recirculation system that circulates water through the enclosure, creating a water current within the enclosure that allows a user/swimmer to swim in the pool while remaining substantially stationary. The water recirculation system includes a pumping system (not explicitly depicted in the figure) which pumps water into enclosure 102 at flowhead 104. Water flows through enclosure 102 and the natural flow of the water causes it to exit the enclosure through an outlet (not shown in the figure) at a rearward end of the enclosure. Water at the outlet is then drawn back to flowhead 104, which pushes the water back into the enclosure. The specific details of the basic recirculation functions of the water recirculation system are not described in detail here, since they are not important the invention.

Pool system 100 includes a series of cameras that are used to capture images of the swimmer within the aquatic environment of the pool. In this embodiment, the series of cameras includes two overhead cameras 106a and 106b. These cameras are positioned to capture images of the swimmer from above the surface of the water. In some embodiments, one or more of the overhead cameras has a field-of-view which is sufficiently wide to capture images of the swimmer's entire body. The images from the overhead cameras therefore allow subsequent processing to determine the position of the swimmer's entire body (including head, arms, hands, legs, feet) for purposes of analysis.

It should be noted that, when a common reference number is used with an alphabetic character to indicate components of the system (e.g., overhead cameras 106a and 106b), the common reference number may be used herein without the alphabetic character to collectively indicate the set of components that use the common reference number, or to indicate any one of the components using the common reference number (e.g., "overhead cameras 106" refers to both camera 106a and camera 106b, and "overhead camera 106" refers to either of camera 106a and camera 106).

The series of cameras incorporated into system 100 also includes one or more subsurface cameras 108a-108c. As depicted in FIG. 1, this embodiment actually has windows in the walls and floor of enclosure 102 through which subsurface cameras view the swimmer. The cameras themselves are positioned behind these windows (e.g., at the exterior of enclosure 102). It should be understood that that other embodiments may alternatively use other configurations for the subsurface cameras, such as using cameras that can themselves be positioned within the water inside the enclosure.

Subsurface cameras 108 are provided for several reasons. For instance, each of these subsurface cameras provides a different view of the swimmer that is not available to overhead cameras 106 (e.g., these cameras may provide a view of the swimmer's face). Additionally, the view of the swimmer from subsurface cameras 108 is not interrupted by the air-water interface (i.e., the surface of the water) and consequently is not subject to the distortions that may arise from disturbances at this interface (e.g., waves on the water's surface). Still further, subsurface cameras 108 may have a smaller field-of-view than overhead cameras 106 to provide a more close-up view of particular parts of the swimmer's body in order to provide greater image detail for analysis of the swimmer's body position and gestures. For example, subsurface camera 108b may provide a close-up view of the swimmer's head to enable improved detection of facial expressions and gestures of the head (e.g., shaking or nodding the head), while subsurface cameras 108a and 108c may provide a close-up view of the swimmer's arms and hands to allow better recognition of arm and gestures. All of the cameras in their respective positions also provide additional and/or improved image data for analysis of the swimmer's body position for purposes of movement/performance analysis.

Each of overhead cameras 106 and subsurface cameras 108 is connected to a computer system 110. Raw image data is conveyed by each of the cameras for processing by the computer system, which may contain one or more processors that are configured to process and interpret the data. Computer system 110 may, for example, include a GPU that is specifically configured to examine the image data and to identify the position of the swimmer's body, including the positions of skeletal joints, arms, hands, fingers, etc. within the images captured by the cameras. In one embodiment, the GPU executes a computer vision application which performs this function.

The body position information which is generated by the GPU is then output to a game engine in the computer system which is configured to determine whether the swimmer's body position and/or changes in the body position from image to image over time represents a gesture made by the swimmer. The game engine may be programmed to take preprogrammed actions in response to the identification of corresponding gestures or body positions that are identified in the received position information. For instance, if the swimmer stops swimming and stands up in the pool enclosure, the game engine may generate a control output which stops the recirculation of water through the pool enclosure, and may further pause an application (e.g., for playback of video) which is currently in use by the swimmer.

Computer system 110 is additionally connected to a controller for the water recirculation system so that, as noted above, the recirculation of the water through pool enclosure 102 can be controlled in accordance with the gestures of the swimmer in the enclosure. Further, computer system 110 is connected to a display system that is integrated into the pool enclosure. These projectors receive display images generated by the game engine for display to the swimmer. In one embodiment, a pair of projectors 112a, 112b are positioned on each side of the pool enclosure. These projectors are short-throw projectors that are configured to project images on the interior surfaces 103 of pool enclosure 102 (e.g., floor and front and side walls). As with the cameras, the figure depicts windows in the enclosure, and the projectors are positioned behind the windows so that their respective images are projected through the windows and onto the enclosure surfaces. Other embodiments may use alternative display configurations. In addition to the displays projected into the inners surfaces of pool enclosure 102, a touchscreen monitor 122 or other type of conventional display can be provided at the upper part of the enclosure wall to enable the swimmer to have direct manual interaction with the pool system.

In some embodiments, computer system includes components which are configured to enable interconnection of pool system 100 to other devices external to the system (e.g., via wireless network 111). For example, computer system 110 may be configured to enable communication between this system and similar pool systems 110 to enable "competitions" or other interactions between swimmers in the different systems. Any other type of external device may also be enabled to communicate with pool system 100 via this network connection. The system may include various different types of technologies to enable this communication between devices, including ethernet, Wi-Fi, Bluetooth, or any other suitable technology.

Pool system 100 may include various sensors 114 which are connected to computer system 110, and which provide data which is input to the computer system to facilitate, enable or augment the interpretation or analysis of image data received from cameras 106 and 108. For instance, sensors 114 may include depth sensors, radar sensors, acoustic sensors, or the like which assist in determining the position of the swimmer's body within enclosure 102. Sensors 114 may also provide data related to the condition or operation of the pool system itself, such as temperature sensors, water level sensors, waterflow sensors, etc.

In this embodiment, pool system 100 includes a set of speakers 116 which are installed in enclosure 102 to provide audio within the aquatic environment of the system. The speakers may provide audio that accompanies a video playback, sounds associated with an application executing on computer system 110, audio signals generated as a component of a user interface, or any other sounds that might be provided to the user. The speakers may be used with bone conduction headphones 126 that are worn by the user. Pool system 100 further includes a set of lights 118 which are installed in enclosure 102. These lights may be, for example, LEDs that are provided to illuminate the interior of enclosure 102, provide visual effects associated with applications executing on computer 110, provide visual feedback as part of a user interface, etc. Pool system 100 also includes a set of bubble ports 120 which are positioned at the forward and of enclosure 102. These ports may be used to generate bubbles that provide sensory effects to the swimmer as part of an application for an immersive experience. Still further, pool system 110 includes a set of water jets 124 which can inject hot or cold water into enclosure 102 to provide sensory effects which further enhance the immersive experience that is presented to the swimmer.

The features of the pool are described in more detail below.

Large video screens. Embodiments of the present invention may have installed and/or projected screens that cover many surfaces in order to create a seamless environmental sensation. This transforms the space to feel like a boundless world. The images projected on the screen (e.g., the interior surfaces of the pool enclosure) can be programmed to move at the same speed as the water flow of the pool, and in the direction of the user moves, so that the user feels as if they are in that environment. This is accomplished by pairing the power of the flow motor's VFD and matching it with the flow rate of the projected environment. In some cases, the speed flow of the video may need to actually flow faster or slower than the actual water flow in order to augment a sense of realism or prevent nausea. The experience does not feel like one is watching a movie or recorded footage, but instead feels like one is in the environment and moving seamlessly through it, just as one would if they were actually, physically in that environment.

Bubble ports. During certain experiences in the present embodiments, bubbles are released into the pool to enhance the sensation of a projected visual environment (e.g. an underwater explosion), or be used to indicate important events (e.g. yardage markers) in a swimming event. These bubbles are also be used to provide feedback the user can feel, similar to that of a vibration setting on a mobile phone.

Water jets. During certain moments during the use of the present embodiments, water jets create targeted pressure streams to enhance the sensation of a projected visual environment (e.g. a whale shark "brushing" past the user). These jets are also used to provide feedback the user can feel, similar to that of a vibration setting on a mobile phone.

Speakers. In some embodiments, sounds are introduced into the pool to complement the visualized environment and deliver numerous types of sounds and music. In these embodiments, speakers can deliver sound to develop ambient noise, signal an alert, emphasize a planned moment, etc., which last many seconds or minutes, depending on what is best needed to compliment the technology experience. In some embodiments, speakers also allow therapists, coaches, physicians, and other users to communicate with the user in real time.

Bone Conduction Headphones. Bone conduction headphones may deliver audio to help the user discern between music, sounds and spoken words. In some embodiments, bone conduction headphones work in tandem with the other speakers to enhance the overall effect of any sounds. In these embodiments, the bone conduction headphones also provide direct communication to a user from a coach, physical therapist, competitor, or otherwise.

LED lights. LED lights can contribute to a number of features. For instance, through colors, some of the present embodiments use LEDs to signal that a pool is available, occupied or needs service, that the user requires assistance or help, or that the user has achieved a goal/status. In another example, the LEDs enhance the displayed environment. For example, if a digital "shark attack" is about to occur, the LEDs can illuminate the entire pool with a blinking red aura. In another example, LEDs provide recognition of interaction/feedback with the pool. For example, in some embodiments, if a user selects a specific workout, the lights quickly flash green. The lighting serves/provides a diverse variety of functions such as signaling excessive effort, improper technique, completion of a particular regimen, pool status, and many different entertainment functions.

Hot/Cool Streams. Embodiments of the present invention may eject brief streams of fluid that are either hot or cold in order to provide the user a secondary sensation to compliment the visual environment. For example, the user might swim over an ocean trench, and the present embodiments may introduce a cool stream that surrounds a user's body. The hot/cool jets can also be used to super cool or heat the user to improve their endurance or ability to swim harder, longer.

Wave-Maker. Embodiments of the present invention may produce waves for a number of reasons, such as to mimic the ocean or create a sense of open water swimming, provide disruptive interference, signal events or timeframes or to deliver a sensation that compliments the environment.

Flume Current. The flume-style current in the present embodiments is generated at the front of the pool, allowing a user to swim in place in the center of the pool due to the fact their stroke rate and speed is counterbalanced by the speed of the flume. The flume speed self-adjusts based on the environment program, as well as reacts to the user's speed when necessary (e.g. speed up if the user increases speed).

Computers. Embodiments disclosed herein use a computer(s) (and their software and algorithms) to control the pool and its features so that the user experiences a seamless, personalized and dynamic experience. The present embodiment's computer is responsible for numerous tasks, such as, pre-loading a program chosen by the user, adjusting the pool's environment based on the activity, recognizing the user in the pool (including analyzing their movements), managing data connections between pools, processing any artificial intelligence data and learnings, updating its software and firmware, incorporating new technological additions (physical and digital), and more.

Wifi. Embodiments of the present invention can connect to the internet so pools can receive and deliver data to and from the cloud constantly on a real time basis. Through WiFi, these embodiments connect to other machines, creating a mesh network where information can be shared. Networked pools offer users the ability to play games and competitions between each other, deliver data on-demand or on a schedule and receive instant updates simultaneously, providing a unified pool experience. Networking further allows off-site management of users located in many different venues by a central figure such as a therapist or coach who remotely oversees a group on a real time basis.

Bluetooth. Embodiments disclosed herein may use wearable devices to enhance the ability to interact, react and learn from the user. For example, the user might wear a series of sensors on their arms and legs that provide a clearer picture of the user's movement and efficiency through the water. The wearable devices transfer data to the pool to improve the experience to better reflect the user's movement and capability.

Cameras. Embodiments of the present invention use a series of cameras mounted in, around and/or above the pool to provide computer vision, help the computer identify the user, know who the user is (i.e. their name, swimming background, workout history, etc.) and their movements, and then automatically adjust the pool's functions. The computer vision is used in understanding the user's interactions (i.e. directives to the computer), as well as states of health. For example, the computer vision detects if a user has chosen to move to the left in an environment, or requested the flume to increase its flow speed or accept a request to compete in a shared real-time workout from another connected pool. Additionally, the computer vision detects if a user is in distress, automatically sending an alert for help and beginning a quick rapid response draining of the pool. Information acquired by the pool's cameras is shared with complimentary technologies of the system to maximize monitoring accuracy and user safety. The computer vision also allows remote monitoring and assessment of each user without the necessity of physical, on site presence.

Depth sensors. A user's position in the pool can be determined by a depth sensor. This data point helps adjust the flow of the flume speed, as well as the displayed environment around the user. Depth sensors also detect directions provided to the pool from the user. Information from the depth sensor is shared with the lasers and cameras for improved monitoring accuracy.

Lasers. The lasers detect a user is in the pool, and importantly monitor their heart rate. This feature enables the pool to understand if a person is in distress, or conversely, if they are not meeting a desired cardiovascular goal. This data adjusts according to the biometrics of the user. Information acquired by the lasers is shared with complimentary technologies of the system to maximize monitoring accuracy and user safety.

LED Touchscreen. Some embodiments of the present invention use a screen placed on the side of the pool to give the user the ability to provide physical, manual input to the pool system, effectively enabling the pool to be controlled without the need to analyze a user's gestures. The pool screen also displays certain information pertinent to the user in the pool, to maintenance personnel or to emergency responders.

Figure 2:
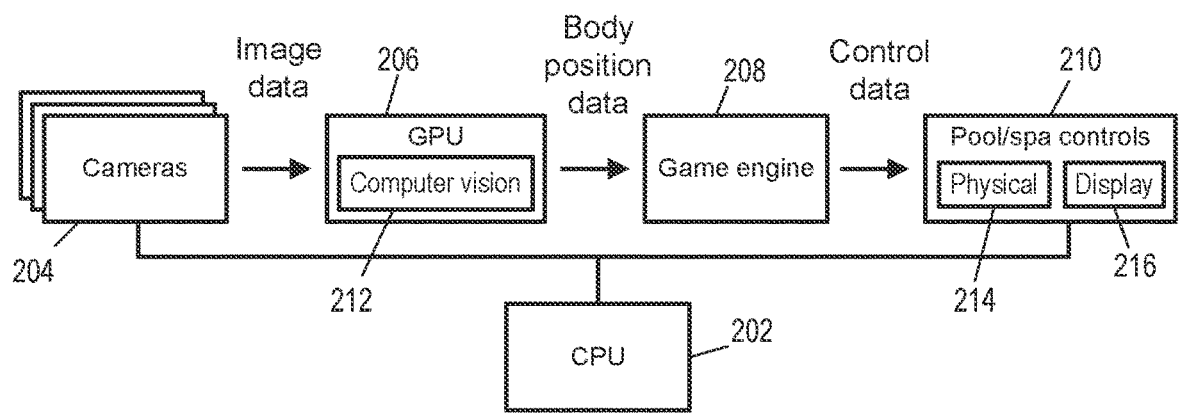
FIG. 2 is a block diagram illustrating the flow of information between components of the exemplary pool system in accordance with some embodiments.

Referring to FIG. 2, a block diagram illustrating the flow of information between components of the exemplary pool system is shown. As depicted in this figure, CPU 202 is coupled to cameras 204, GPU 206, game engine 208 and pool controls 210. CPU 202 is configured to manage the transfer of information between these other components of the system. The CPU is responsible for numerous tasks, such as pre-loading a program chosen by the user, adjusting the pool's environment based on the activity, recognizing a specific user in the pool (including analyzing their movements), managing data connections between pools, processing any artificial intelligence data and learnings, updating its software and firmware, incorporating new technological additions (physical and digital), and the like.

As noted above, cameras 204 (which include the overhead and subsurface cameras) capture images of the swimmer within the pool enclosure. In one embodiment, the cameras are synchronized so that each of the cameras capture images of the swimmer at the same moment time, so that the image data from each of the cameras corresponds to the same body position. This allows the body position of the swimmer to be determined based on multiple images, thereby increasing the accuracy of the determination. For instance, image of the swimmer captured by one of the overhead cameras may be somewhat obscured by distortions (e.g., ripples or waves in the water's surface) that obscure the swimmer's body position, so images from the subsurface cameras, which are not distorted by the air-water interface, may be used to more accurately gauge the swimmer's body position. Images are continually captured by the cameras at a configurable rate (as still or video images) to enable the swimmer's motions from one moment to the next to be determined.

The image data generated by the cameras is provided to GPU 206, which processes the image data to identify the swimmer's body position at each moment in time. One of the unique aspects of the present embodiments is the use of a computer vision engine in an aquatic environment. The key points of the body are extracted using a skeletal mapping software, and the body's key points are provided to a game engine that executes logic that detects when a user/swimmer makes a gesture or takes some other action in the pool enclosure. For example, when the swimmer stands up instead of swims, this drives a control interface that slows or stops the flow of water through the pool enclosure, as well as driving a display interface update (e.g. to pause a projected game screen). The computer vision system can also update an interface to actively provide updates to help the swimmer improve their swimming technique and develop better muscle memory (e.g., by showing the swimmer that in the last stroke their hand was in a less than optimal position, and providing an indicator of the proper hand position so that the swimmer can correct their hand position and achieve a more efficient stroke).

In one embodiment, GPU 206 executes computer vision software 212 which processes the image data to identify the position of the swimmer's body. For example, GPU 206 may execute Wrinch.AI, OpenPose or another computer vision platform which receive image data feeds from the cameras and provide real-time analysis of the image data. The specific computer vision platform is not important, as long as it can capture the key positions of parts of the swimmer's body. The computer vision platform is configured to detect and recognize movement of a human in the images. The computer vision platform then layers and skeletally maps the detected movement of the user in order to understand where the user's body and limbs are. In other words, the platform captures the key points/coordinates of the swimmer's body.

Once the computer vision platform generates this information, the information is sent to the game engine 208.

In one embodiment, the image data from the cameras is also provided to a second application which is configured to interpret the image data and analyze the data for purposes of physiological analysis. For instance, this application may determine the number of strokes performed by the swimmer in the images, the stroke force velocity of the swimmer, etc.

When the swimmer's body position data has been generated by the computer vision platform, this information is conveyed by CPU 202 to game engine 208. In one embodiment, game engine 208 may be implemented using an application such as Unity. Game engine 208 receives the key points of the swimmer's body position from the CPU and executes logic to detect and identify gestures and other movements represented by the body position. For example, the game engine detects when the user/swimmer stands up instead of swims. When this occurs, the game engine drives an interface update that pauses the projected display 216 (e.g., a game screen or interactive experience), and also generates signals that are provided to the pool control system 214 to cause the water flow through the pool to decrease or stop.

Game engine 208 can also help swimmers improve their swimming technique by providing an interface that adjusts based on the swimmer's real time body movement. The GPU's detailed monitoring of the swimmer's movements provides data for analysis of the swimmer's body position to determine the swimmer's stroke mechanics and efficiencies (or non-efficiencies). In some embodiments, a display is provided to the user which shows the swimmer's body position in real time with coaching/training indicators showing how the swimmer's stroke can be improved (see, e.g., FIGS. 8-10). By providing real time feedback of the swimmer's movements with these indicators, the system enables the swimmer to adjust their stroke for better performance.

Figure 3:
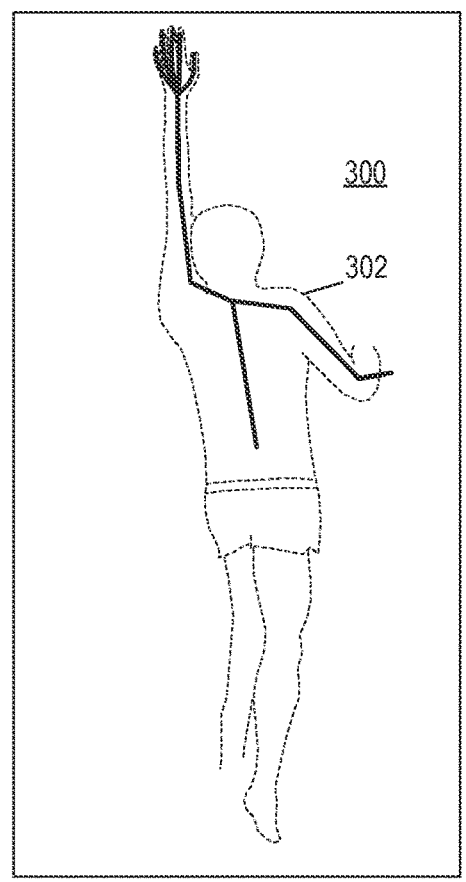
FIG. 3 is a diagram illustrating the identification of a swimmer's body position in an image received from one of the overhead cameras in accordance with some embodiments.

Referring to FIG. 3, a diagram illustrating the identification of a swimmer's body position in an image received from one of the overhead cameras is shown. As described above, an image 300 from one of the overhead cameras is provided to the GPU for analysis. Within image 300 is the swimmer 302 (indicated by the dashed lines). The computer vision platform analyzes the image, identifying portions of the image which comprise portions of the swimmer's body (e.g., torso, head, arms, legs, etc.). The recognized portions of the swimmer's body are analyzed to identify key points in the swimmer's body position. These points are represented by the solid lines which are shown on the image. It should be noted that these lines are not part of the original image, but are generated by the computer vision platform to represent the swimmer's body as captured in the image. Data corresponding to the key points represented by the lines is generated and stored by the computer vision platform for further processing.

As depicted in the figure, the key points recognized by the computer vision platform include the positions of the swimmer's torso, shoulders, elbows, wrists, fingers, etc. data indicating the identified key points in the image are provided to the game engine for analysis. The key points are analyzed to detect and identify gestures made by the swimmer that should be interpreted as control inputs by the swimmer (e.g., selecting a button, stopping the water flow through the pool enclosure, etc.), as well as movements of the swimmer which are analyzed for purposes of monitoring the swimmer's activity and health.

In the example of FIG. 3, it can be seen that analysis of image 300 determines that the fingers of the swimmer's left hand (at the top of the figure) are extended, and that the hand is open. The open hand may be recognized as a part of the normal swimming motion, rather than a specific gesture. If it were instead determined that the fingers of the swimmer's hand were curled into a fist, or if only a single finger or a thumb were extended, this might be interpreted as a specific gesture by the swimmer. If such a gesture were identified by the game engine, it would generate one or more corresponding control inputs which would be provided to the display or control systems of the pool.

It should be noted that the specific gestures which are recognized by the system, as well as the inputs, functions or other control signals which are generated in response to the specific gestures, are configurable. As indicated above, control gestures may include, for example, custom gestures such as a closed fist, an extended finger or thumb, a nod or a shake of the head, etc. When one of these custom gestures is detected, the system is configured to take corresponding actions that are defined for these gestures. The custom gestures may be specific to particular applications or controls and may result in the generation of different control inputs depending upon the context of the system or application when the gesture is made, or they may be defined so that they are interpreted as the same input across multiple applications or contexts.

The gesture or motion which is detected by the computer vision platform may involve the analysis of individual images, or a series of images, depending upon the context and the gesture. For instance, it may be possible for the system to detect a gestures such as a closed first or a single extended finger based on the analysis of a single image. Other gestures (e.g., a nod of the head or a wave of the hand) may require analysis of multiple images (e.g., frames of a video stream) in order to identify the gesture, since these gestures are based on differences in the swimmer's body position over time.

It should also be noted that the identification of a gesture or motion of the swimmer's body may require analysis of images from two or more of the cameras in the pool system. For example, it can be seen in FIG. 3 that portions of the swimmer's body are not fully visible within this image. In particular, the swimmer's right forearm and hand are not visible because they are extended downward as the swimmer pulls through the stroke with the right arm. The right forearm and hand are therefore obscured by the elbow, as well as being distorted by disturbances at the surface of the water. Similarly, the swimmer's left lower leg and foot are not clearly visible in the image because they are positioned below the surface of the water and are obscured by distortions from disturbances at the surface of the water. Since these portions of the swimmer's body or not clearly visible in the image from the overhead camera, the system may examine this image in conjunction with images captured by one or more of the other cameras. For instance, particularly with respect to the hands of the swimmer, images from one or more of the subsurface cameras may provide a more close-up view of the swimmer, as well as providing a view without the distortion caused by disturbances at the air-water interface. Therefore, in one embodiment, the computer vision platform may determine the general position of the user's body based on the image from an overhead camera, and may then use the image data from a subsurface camera to refine the positions of the relevant key points (e.g., the positions of the fingers of the swimmer's left hand in the example of FIG. 3.

Figure 4A:
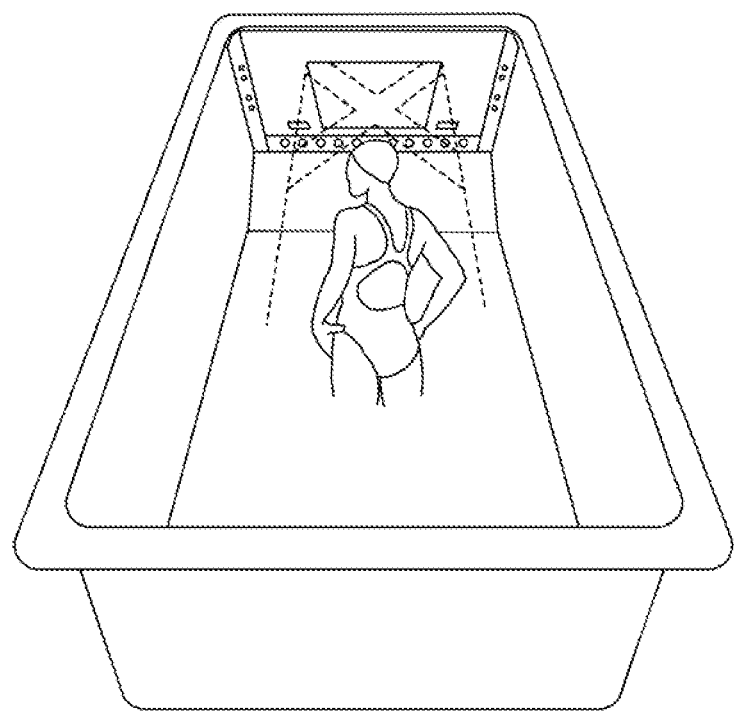
FIGS. 4A-4B are diagrams illustrating examples of gestures/actions of a user to control the operation of a flume swimming pool in accordance with some embodiments.
Figure 4B:
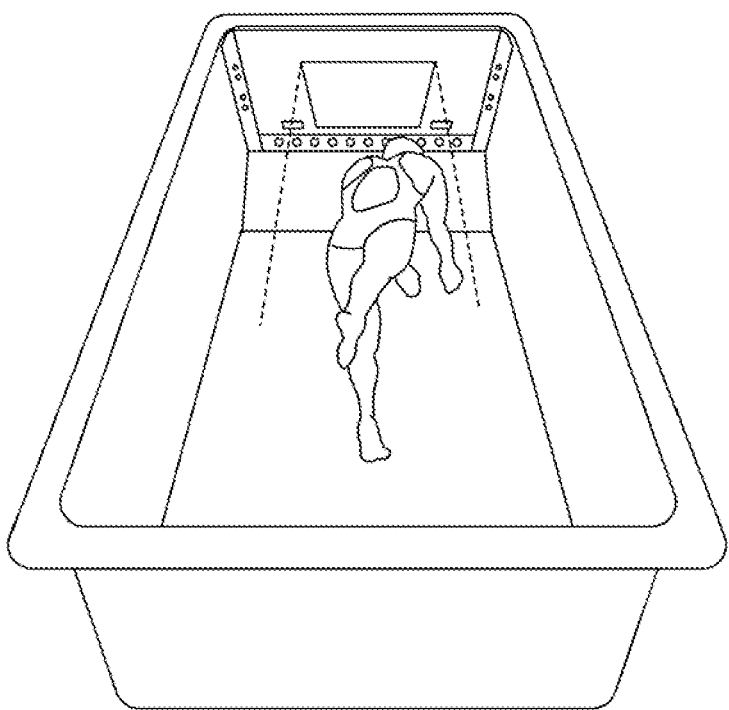

Referring to FIGS. 4A-4B, examples of gestures/actions of a user to control the operation of a flume swimming pool in accordance with some embodiments are shown. FIG. 4A is a first example of a gesture or movement of a user/ swimmer that is used to control the operation of a pool. As depicted in this figure, the user/swimmer's body is in a vertical or upright position (i.e., the user/swimmer is standing) in the water within the pool enclosure. The cameras of the pool system capture an image of the user/swimmer's body and interpret this position as a "standing" position. The standing position is programmed into the system as a gesture/action which indicates that the user/swimmer is not swimming, and is therefore interpreted as a user input indicating that the flow of water through the pool enclosure is to be stopped or paused. This standing position is also interpreted in this embodiment as a gesture/action which indicates that a video application which is being displayed to the user/swimmer (e.g., projected onto one or more interior surfaces of the pool enclosure) is to be paused.

FIG. 4B is another example of a gesture/movement of a user/swimmer that is used to control the operation of the pool. In this figure, the body of the user/swimmer pushes forward into the water with the user/swimmer's torso moving toward a generally horizontal position. This gesture/ movement is captured by the system's cameras, and the computer vision platform interprets this gesture action as representing a control input to begin (or un-pause) operation of the pool and/or display of an experience/application that is being displayed to the user/swimmer. The pool system is programmed to associate corresponding actions with this input, including starting/increasing the flow of water through the pool enclosure and starting/continuing the display of the experience/application to the user/swimmer. While the user/swimmer continues to swim in the pool enclosure, the system continues to recirculate water through the enclosure and project the user experience display on the interior walls of the enclosure. When the user/swimmer chooses to stop swimming, they will discontinue the swimming motion and begin to move toward the standing position. This gesture/motion is programmed by the system to correspond to control inputs which, again, stop the flow of water through the enclosure and pause the display of the user experience.

In some embodiments, using data input by the user or by performing physiological analysis of the user (using facial, gestural or other biometrics), a user profile of the user is generated. Each user is assigned values against their skeletal movement, and the values are recorded in a database of recorded skeletal movement. Then, the system can determine who is in the pool by comparing the computer vision analysis of the user currently using the system against the database to identify the user. Facial composition or other unique physical defining characteristics can also be measured and compared against the database. When the system detects a complete match of the current user's information with information for a user in the database, the system recognizes the identified user profile as the user in the water. This process can function with multiple users concurrently.

Figure 5A:
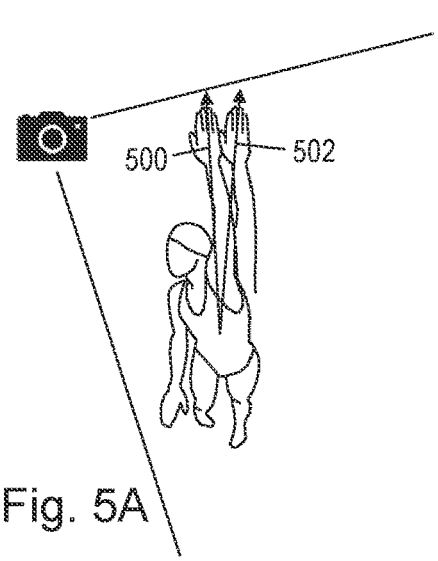
FIGS. 5A-5E are diagrams illustrating several additional examples of gestures which may be made by a user/swimmer to provide control inputs for the pool system in accordance with some embodiments.
Figure 5B:
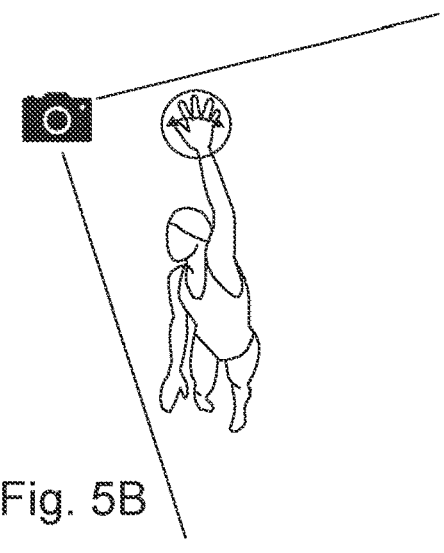

Referring to FIGS. 5A-5E, several additional examples of gestures which may be made by a user/swimmer to provide control inputs for the pool system in some embodiments are shown. Each of these figures shows a swimmer within the field of view of a camera which captures an image (or images) of the user/swimmer making a specific gesture as they swim. FIG. 5A shows the user/swimmer with their leading arm (the left arm) in two slightly different positions. The image processed by the computer vision system actually captures the user/swimmer's arm in only one position—the other arm position is provided in the figure for reference. In this figure, the arm position 500 which is slightly to the left represents the position of the arm when the user is swimming straight. This position is determined by the computer vision platform based on image data which was previously captured at a time when the user/swimmer was assumed to be swimming in a straight line. The arm position 502 which is slightly to the right represents the position of the arm when the user is attempting to veer to the left while swimming. This positioning of the arm slightly to the user's left (in comparison to the position of the arm while swimming in a straight line) is interpreted as a gesture/motion which indicates a user input or control input which is intended to cause the user experience to veer to the left. Accordingly, the pool system generates an image corresponding to a slight veer to the left, and this image is displayed to the user in this embodiment, projected onto the interior wall(s) of the pool enclosure. The flow of water through the enclosure or water jets within the enclosure may also be adjusted to simulate for the user/swimmer a slight turn to the left.

Figure 5C:
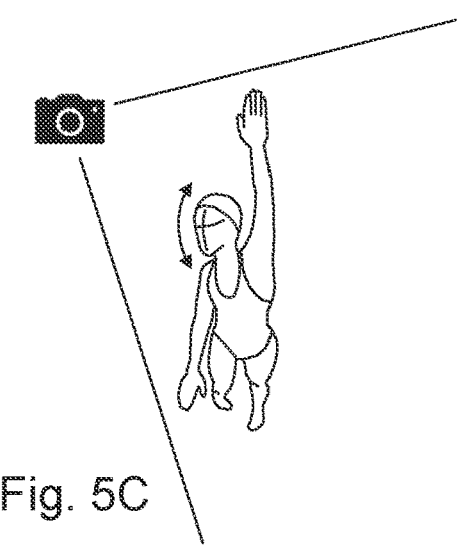
Figure 5D:
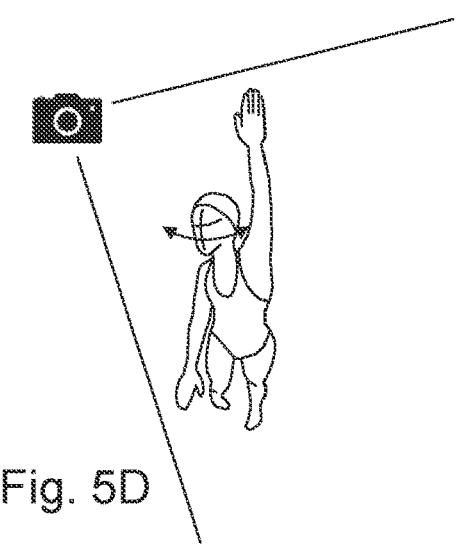

FIG. 5C shows the user/swimmer nodding their head up and down as indicated by the substantially vertical double-headed arrow. Again, since this gesture a motion of the head, rather than a single detected position of the head, it is detected based on image data from multiple images or frames. When this nodding gesture/motion is detected, the system interprets the gesture/motion in accordance with the programming of the game engine, and appropriate, corresponding actions associated with the gesture/motion are taken in response to detection of the gesture/motion. In some embodiments, the nodding of the head is interpreted as an affirmative response (e.g., "yes" or "okay"). FIG. 5D shows the user swimmer shaking their head from side to side as indicated by the substantially horizontal double-headed arrow in the figure. This gesture/motion is detected and interpreted in substantially the same manner as the nodding gesture/motion. Since the head-shaking gesture/motion is distinct from the nodding gesture/motion, the head-shaking, gesture/motion is given distinct, corresponding interpretation as programmed into the game engine. In some embodiments, the shaking of the head is interpreted as a negative response (e.g., "no" or "dismiss").

FIG. 5C shows the user/swimmer nodding their head up and down as indicated by the substantially vertical double-headed arrow. Again, since this gesture a motion of the head, rather than a single detected position of the head, it is detected based on image data from multiple images or frames. When this nodding gesture/motion is detected, the system interprets the gesture/motion in accordance with the programming of the game engine, and appropriate, corresponding actions associated with the gesture/motion are taken in response to detection of the gesture/motion. In some embodiments, the nodding of the head is interpreted as an affirmative response (e.g., "yes" or "okay"). FIG. D shows the user swimmer shaking their head from side to side as indicated by the substantially horizontal double-headed arrow in the figure. This gesture/motion is detected and interpreted in substantially the same manner as the nodding gesture/motion. Since the head-shaking gesture/motion is distinct from the nodding gesture/motion, the head-shaking, gesture/motion is given distinct, corresponding interpretation as programmed into the game engine. In some embodiments, the shaking of the head is interpreted as a negative response (e.g., "no" or "dismiss").

Figure 5E:
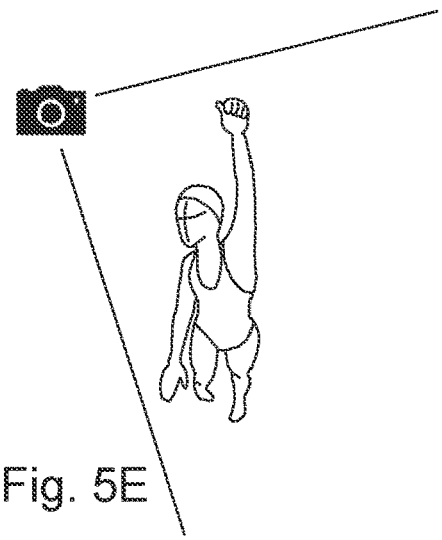

FIG. 5E shows the user/swimmer making a closed fist with their leading hand this gesture can be detected in a single image, so there is no need to compare multiple images in order to detect motion of the user/swimmer's hand (as with the wave). The game engine can therefore detect the gesture based on the body position information received from the computer vision platform. As with the other gestures, when the closed-fist gesture is detected by the game engine, it interprets this gesture as previously programmed.

Figure 6:
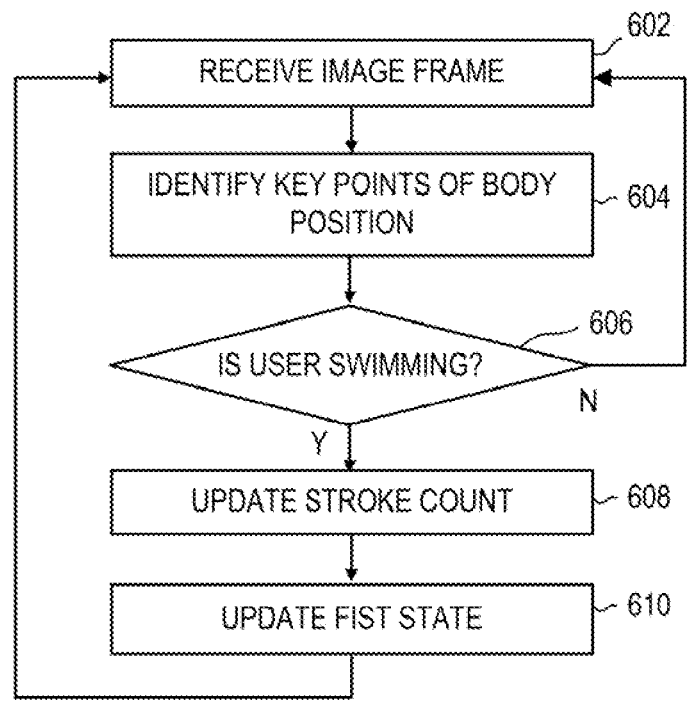
FIG. 6 is a flow diagram illustrating the operation of the computer vision platform and game engine in relation to tracking the performance of the swimmer in accordance with some embodiments.

Referring to FIG. 6, a flow diagram illustrating the operation of the computer vision platform and game engine in relation to tracking the performance of the swimmer in accordance with some embodiments is shown. As depicted in this figure, and image frame is first received 602. The computer vision platform then identifies key points of the user/swimmer's body position 604. The identified key points are then interpreted to determine whether or not the user is swimming 606. If the user is not swimming, the computer vision platform receives another image frame 602 from the cameras and the process repeats. If it is determined from the identified key points that the swimmer is swimming, the swimmer's stroke count is updated 608 by a process illustrated in FIG. 7, which is described in more detail below. The "fist" state (in which the user's fingers are curled into a fist) is then updated 610. After updating the fist state, a new image frame is received 602 and the process repeats.

The computer vision system determines whether or not the a user is actively swimming in the pool (i.e. whether the system is in the swimming state) based on the analysis and interpretation of image frames received from the pool system's cameras. In one embodiment, this is accomplished by determining from the image frames whether the following conditions are met in seven of the last 30 image frames: (1) the distance in the X axis from the user's neck to the user's hip is greater than 100 pixels; and (2) the position of the hip and the X axis is smaller than the position of the neck in the y-axis, or vice versa, depending upon the camera and pool orientation defined by the user. In one embodiment, a frame is counted twice instead of once if both conditions (1) and (2) are met and either of the user's arms is extended.

In some embodiments, the computer vision system determines the fist state (i.e., whether or not one of the user's hands is forming a fist) by determining whether the following conditions are met in 11 of the last 30 image frames: (1) either the right or left arm is stretched forward; and (2) there are no more than two extended fingers on the hand of the arm that is stretched forward. In one embodiment, if at least three fingers of the hand on the extended arm are not extended in an image frame, that frame is counted as four frames instead of one.

Figure 7:
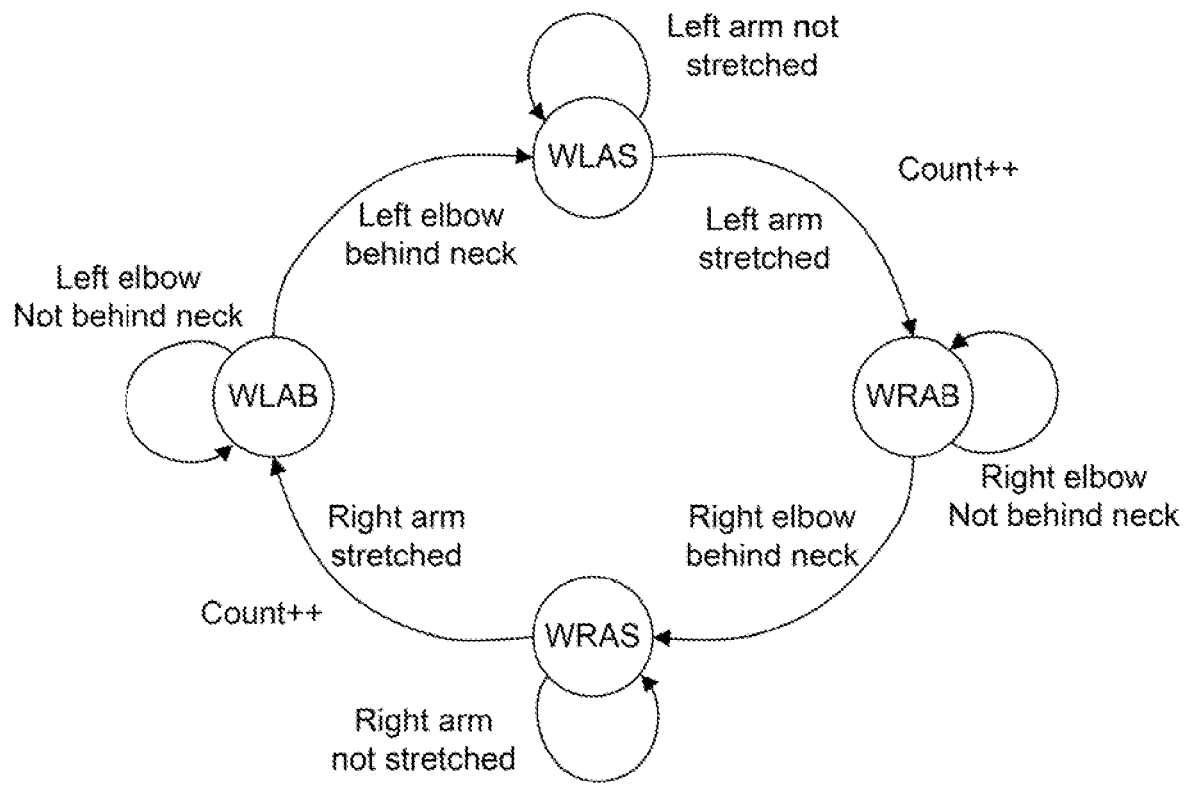
FIG. 7 is a state diagram illustrating a process for counting strokes in accordance with some embodiments.

Referring to FIG. 7, a state diagram illustrating the manner in which the user/swimmer's strokes are counted in accordance with some embodiments is shown. As depicted in this figure, a stroke is counted each time the swimmer extends one of their arms from a position in which the elbow is behind the swimmer's neck to a stretched (forward) position. The state diagram includes four states: waiting for right arm behind (WRAB); waiting for right arm to be stretched (WRAS); waiting for left arm behind (WLAB); and waiting for left arm to be stretched (WLAS). The transitions between these states are dependent upon the positions of the swimmer's arms and elbows as identified by the computer vision platform.

The process may begin in any one of the four possible states. It will be assumed for the purpose of explaining the diagram that the system is initially in the WRAB state (at the right side of the diagram). While the system is in this state, the computer vision platform examines the next image frame and determines whether the position of the right elbow as seen in this image frame is behind the swimmer's neck. If not, the system remains in this state and the next image frame is analyzed. If the system determines that the right elbow is behind swimmer's neck, the system transitions to the WRAS state. While in this state, the system examines the next image frame and determines whether the right arm is stretched. If not, the system remains in the WRAS state and the next image frame is analyzed. If the image frame is interpreted as showing that the right arm is stretched, the system increments the stroke count and moves to the WLAB state. In this state, the next image frame is examined to determine whether the left elbow is positioned behind the swimmer's neck. If not, the system remains in this state and the next frame is analyzed. If the computer vision system determines from the image frame that the left elbow is positioned behind the swimmer's neck, the system transitions to the WLAS state. In this state, the next image frame is analyzed to determine whether the left arm of the swimmer is stretched. If not, the system remains in this state and the next image frame is analyzed. If the image frame is interpreted to show that the left arm is stretched, the stroke count is incremented, and the system moves to the WRAB state. This process repeats as long as the system is in the swimming state.

As noted above, the game engine of the pool system is configured to monitor the activity of the user and to track the user's performance. The game engine may be configured to collect, store and analyze data for each user, track fitness progress with metrics such as distance, calories, time, etc., and generate statistics for display to the user. The system may also be configured to collect and analyze user data on a backend system which can store the data in the cloud and text the data to the user upon completion of a swim. The data can also be utilized by therapists, physicians and coaches in assessing the user's progress and adjusting their routines or techniques based on this digital feedback.

Figure 8:
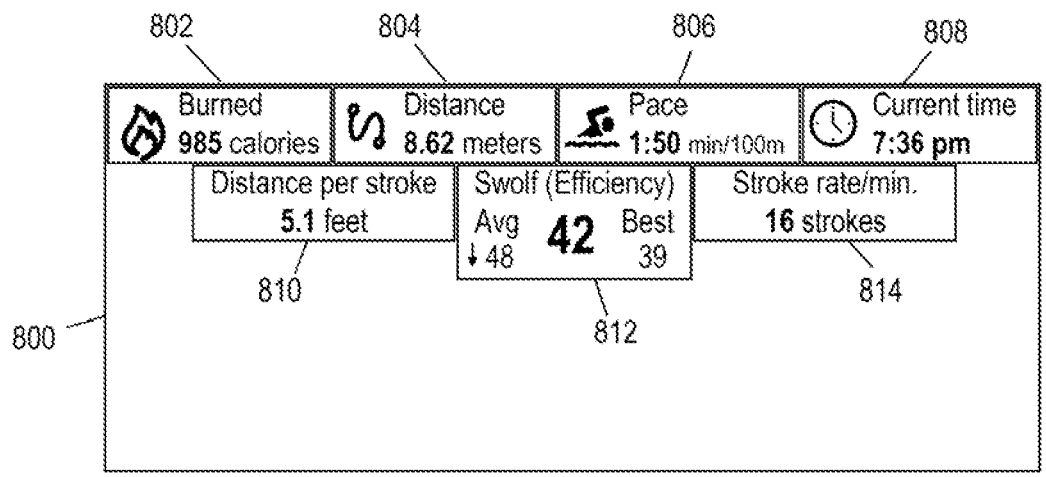
FIG. 8 is a diagram illustrating an interface display which is generated by a game engine in accordance with some embodiments.

Referring to FIG. 8, a diagram illustrating an interface display which is generated by the game engine in accordance with some embodiments is shown. As depicted in this figure, the interface is configured to present a number of performance metrics which are related to the user's swimming activity using the displays that are projected onto the interior surface of the pool enclosure. In this example, the interface 800 includes an indicator of the number of calories burned by the user 802, an indicator of the estimated distance traveled 804, an indicator of the pace 806 at which the user is swimming, an indicator of the current time 808, an indicator of the distance 810 traveled by the swimmer per stroke, an indicator of the efficiency of the swimmer 812 (including average, current and best efficiency values), and an indicator 814 of the stroke rate of the user.

Figure 9:
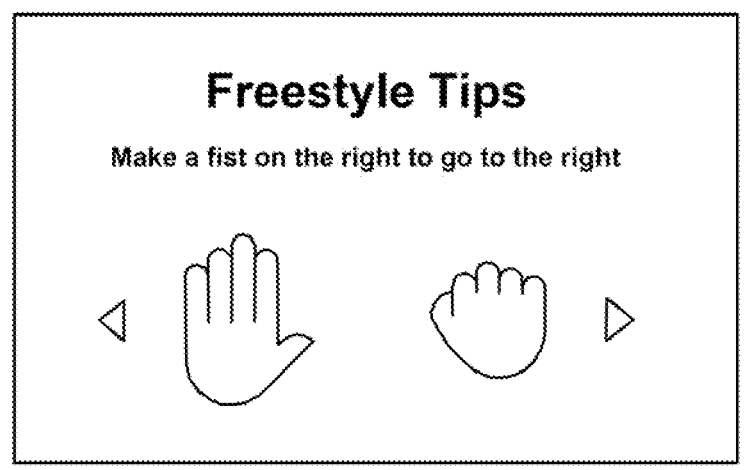
FIG. 9 is a diagram illustrating an interface for displaying performance metrics to a user in accordance with some embodiments.

The user interface displayed to the swimmer in the pool enclosure may also include information that facilitates interaction of the user with the system. For instance, as shown in FIG. 9, the user interface may provide tips to the user relating to the control of the system. In the example depicted in this figure, the display provides a reminder to the user that specific gestures can be used to provide input to a simulated user experience. In this case, the user is reminded that, by making a fist with the right hand, the simulated experience can be caused to turn to the right. Similar displays can be provided to illustrate other gestures as well, such as a head nod, a head shake, a hand wave, an arm signal, start (stand) and stop gestures, etc.

Figure 10:
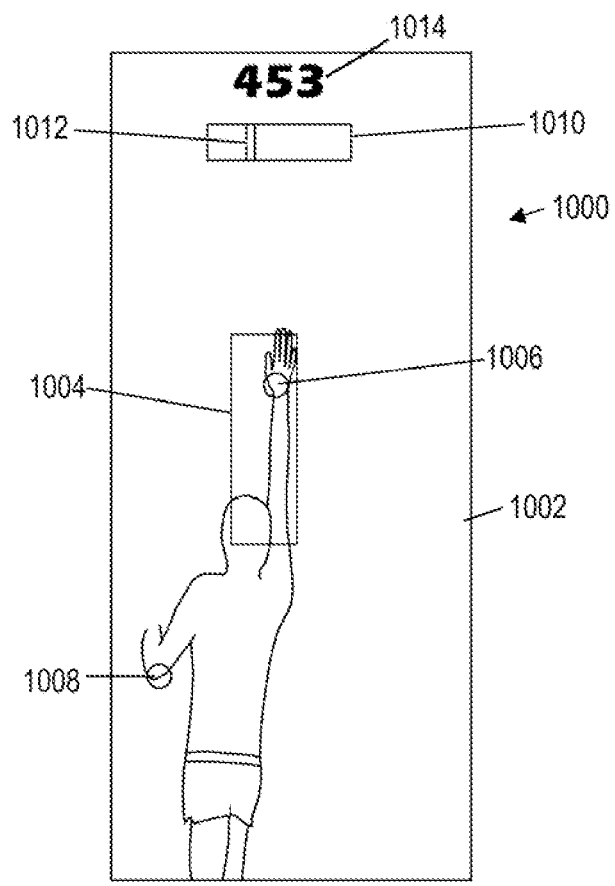
FIG. 10 is a diagram illustrating a coaching/training interface which assists a user/swimmer in correcting or improving their stroke in accordance with some embodiments.

As mentioned above, the user interface displayed to the user/swimmer may provide information which assists the user/swimmer in correcting or improving their stroke. Referring to FIG. 10, an example of such an interface is illustrated. In this example, the display 1000 includes a real time image 1002 of the swimmer from the perspective of one of the overhead cameras. One or more coaching/training indicators are overlaid onto the real time imagery of the user/swimmer to let them know how to improve their stroke. Specifically, the coaching/training indicators include a gauge 1004 which provides a measure of the user/swimmer's reach. A marker is overlaid onto each of the users wrists (marker 1006 indicates the position of the right wrist, and marker 1008 indicates the position of the left wrist). As the user/swimmer reaches forward, the position of the marker on bar 1004 provides an indication of how far forward the user/swimmer is reaching. As the user/swimmer completes this stroke and begins reaching forward with the left arm, a similar gauge is overlaid on the image above their left arm so that they can view the reach of this arm as well. Interface 1000 also provides a horizontal indicator 1010 near the top of the display that indicates a stroke tempo—essentially a metronome that can provide a reference for the swimmer to encourage a certain number of strokes per minute. Indicator 1010 includes a marker 1012 that moves back and forth at the desired stroke rate. When marker 1012 is at the farthest point to the left, the swimmer should be extending their left arm to its greatest reach. When marker 1012 is at the farthest point to the right, the swimmer's right arm should be at its greatest reach. The interface display also includes a stroke count 1014 at the top of the display to allow the user/swimmer to track their activity. These indicators allow the user/swimmer to objectively view how well they are executing each stroke, and to adjust and improve their swimming performance.

Embodiments of the present invention can be installed in people's homes or apartments, fitness centers and gyms of various sizes, water parks, hospitals and rehabilitation facilities centers, community centers, and the like. Additionally, groups of these pools may be placed in specially designed fitness studios in order to create a communal environment (e.g., similar to that of SoulCycle). These studios will be able to better serve communities to enhance pool accessibility, enabling more people to participate in the experience.

No matter where a pool is installed, the present embodiments can digitally connect the pool to the cloud, and consequently to any other similarly enabled pool. Providing digital connections to the cloud and other pools enables communication between pools, provides shared experiences between users, allows the sharing of data related to user monitoring, and enables the pool to update its software and firmware remotely.

There are a number of ways in which a user can interact with the pools as disclosed herein. For instance, a user can reserve a pool for a specific time, essentially locking it so no one else may use the pool. This may be useful in a situation where multiple smart pools are grouped together. Further, a user can program the pool with a pre-selected workout so that when the user arrives, the pool is ready to initiate the desired experience. A user can also request that the pool record and share data with the user's data diary, as well as with other user-approved users. While swimming, the user may press physical buttons in or on the pool, or use gestures to reserve a pool, program the pool, record data during a workout, enter into a competition, select various features during a workout, select a workout experience choice, create and respond to messages, initiate communication with a coach, therapist or other user, request pool maintenance or signal need for immediate help.

The present embodiments can be interacted with by professional, operational, tech or lifeguard staff for reasons including the following:

- assess the user on many different levels ranging from competitive technique to optimal physical rehabilitation effort;
- determine if the pool is currently being used;
- determine how long the pool has been used;
- understand the status of technology components, providing diagnostics of pool;
- be alerted to pool problems, and be able to try and fix the some issues remotely;
- determine the status of the pool's software or firmware, and enable the staff to update the pool as needed, or to automatically set update schedules for the pool;
- send emergency messages or alerts to anyone in the pool; and
- receive and respond to emergency alerts from a user in the pool, including initiating a draining a pool in case of an emergency.

As noted above, embodiments of the technology are implemented using a computer system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer system may include, for example, a computer processor and associated memory. The computer processor may be an integrated circuit for processing instructions, or may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

A processor can include a system with multiple processing units, dedicated circuitry for achieving functionality, or other systems. Processing need not be limited to a geographic location, or have temporal limitations. The memory may store instructions executable by the processor. For example, the memory may include an operating system or processing program, a server program configured to extend the functionality of the page processing program or other server code. Application server code can be executable to receive requests from client computers, generate server files and return files in response.

Embodiments described herein can be implemented using control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nano-engineered systems, or other mechanisms.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
   a flume pool;
   one or more cameras, including a first, overhead camera positioned above a water level of the pool and configured to capture images of a swimmer's body in the pool at least partially through an air-water interface; and
   one or more computer processors configured to
      receive images from the one or more cameras,
      determine from the received images a body position of the swimmer's body in the pool,
      detect in the body position a defined gesture by the swimmer, wherein the defined gesture comprises a defined movement or position of the swimmer's head or hand, and
      in response to detecting the defined gesture, invoke a control operation of the flume pool.

2. The system of claim 1, wherein the one or more computer processors include a graphics processing unit (GPU) which is configured to determine the body position from the received images and to generate skeletal body position data.

3. The system of claim 2, wherein the one or more cameras include a second, below-surface camera positioned below the water level of the pool and configured to capture images of the swimmer's body in the pool.

4. The system of claim 3, wherein the one or more cameras include at least one additional below-surface camera positioned below the water level of the pool and configured to capture images of the swimmer's body in the pool.

5. The system of claim 3, wherein the below-surface camera is configured to capture close-up images of a portion of the swimmer's body.

6. The system of claim 3, wherein the GPU is configured to:
   determine the body position using the images captured by the overhead camera as a primary data reference; and
   when the GPU is unable to determine the body position based on the images captured by the overhead camera, determine the body position using the images captured by the below-surface camera as a secondary data reference.

7. The system of claim 2, wherein the one or more computer processors further include a game engine which is configured to receive the skeletal body position data from the GPU, identify the defined gesture from the skeletal body position data, and generate one or more control outputs corresponding to the defined gesture.

8. The system of claim 7, wherein the one or more computer processors further include a central processing unit (CPU) which is configured to transfer of the skeletal body position data from the GPU to the game engine and to transfer the control outputs from the game engine to one or more control systems of the pool.

9. The system of claim 1, wherein the control operation comprises changing a rate at which water is circulated through the pool.

10. The system of claim 9, wherein in response to the swimmer standing in the pool, circulation of the water through the pool is paused.

11. The system of claim 9, wherein in response to the swimmer pushing forward from a standing position in the pool, circulation of the water through the pool is resumed.

12. The system of claim 1, further comprising a user interface configured to display to the swimmer a real time image of the swimmer overlaid with one or more coaching/training indicators.

13. The system of claim 12, wherein the coaching/training indicators indicate an actual position of a part of the swimmer's body in relation to a desired position of the part of the swimmer's body.

14. The system of claim 12, wherein the one or more computer processors are further configured to track the swimmer's activity based on the detected body position over time and to maintain one or more cumulative performance metrics.

15. The system of claim 1, wherein the one or more computer processors are further configured to, in response to detecting the defined gesture, control a user experience application which is executing on the one or more computer processors, and which is being displayed to the swimmer via an in-pool display.

16. The system of claim 15, wherein the display of the user experience application is synchronized with a flow of water through the pool.

17. The system of claim 1, wherein the one or more cameras include at least one additional overhead camera positioned above the water level of the pool and configured to capture images of the swimmer's body in the pool at least partially through the air-water interface.

18. The system of claim 1, wherein the defined gesture comprises a defined movement or position of the swimmer's head.

19. The system of claim 1, wherein the defined gesture comprises a defined movement or position of the swimmer's hand.

* * * * *